(12) United States Patent
Lee

(10) Patent No.: US 7,522,244 B2
(45) Date of Patent: Apr. 21, 2009

(54) ARRAY SUBSTRATE FOR IN-PLANE SWITCHING MODE LIQUID CRYSTAL DISPLAY DEVICE AND METHOD OF FABRICATING THE SAME

(75) Inventor: Deok-Won Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 412 days.

(21) Appl. No.: 11/398,666

(22) Filed: Apr. 6, 2006

(65) Prior Publication Data

US 2006/0227275 A1 Oct. 12, 2006

(30) Foreign Application Priority Data

Apr. 8, 2005 (KR) .................... 10-2005-0029526

(51) Int. Cl.
*G02F 1/1343* (2006.01)

(52) U.S. Cl. ........................................ 349/141; 349/43

(58) Field of Classification Search ............... 349/141, 349/43
See application file for complete search history.

(56) References Cited

U.S. PATENT DOCUMENTS

2005/0052603 A1*  3/2005  Jin ............................. 349/141
2005/0094079 A1*  5/2005  Yoo et al. ................... 349/141

* cited by examiner

*Primary Examiner*—David Nelms
*Assistant Examiner*—David Y Chung
(74) *Attorney, Agent, or Firm*—Morgan Lewis & Bockius LLp

(57) ABSTRACT

A substrate for an in-plane switching mode liquid crystal display device comprises: a substrate; a gate line on the substrate; a data line on the substrate, crossing the gate line to define a pixel region; a common electrode in the pixel region on the substrate; a thin film transistor formed at a crossing of the gate line and data line; an insulating layer on the common electrode, the insulating layer having a concave portion spaced apart from the common electrode; and a pixel electrode in the concave portion.

21 Claims, 7 Drawing Sheets

ARRAY SUBSTRATE FOR IN-PLANE SWITCHING MODE LIQUID CRYSTAL DISPLAY DEVICE AND METHOD OF FABRICATING THE SAME

The present application claims the benefit of Korean Patent Application No. P2005-0029526 filed in Korea on Apr. 8, 2005, which is hereby incorporated by reference.

BACKGROUND OF THE INVENTION

1. Field of the Invention

The present invention relates to a liquid crystal display device, and more particularly, to an array substrate for an in-plane switching mode liquid crystal display device and a method of fabricating the same.

2. Discussion of the Related Art

In general, a liquid crystal display (LCD) device uses optical anisotropy and polarization properties of liquid crystal molecules. The liquid crystal molecules have orientation characteristics of arrangement resulting from their thin and long shape. Thus, an arrangement direction of the liquid crystal molecules can be controlled by applying an electrical field to them. In other words, as the electrical field applied is changed, the alignment of the liquid crystal molecules also changes. Since the incident light is refracted according to the orientation of the liquid crystal molecules due to the optical anisotropy of the aligned liquid crystal molecules, images can be displayed.

Recently, active matrix LCD (AM-LCD) devices, which have thin film transistors and pixel electrodes arranged in a matrix form, have become the subject of significant research and development because of their high resolution and superiority in displaying moving images. The AM-LCD devices include upper and lower substrates and a liquid crystal layer disposed between the upper and lower substrates. The upper substrate, referred to as a color filter substrate, includes a common electrode. The lower substrate, referred to as an array substrate, includes a pixel electrode. As a result, AM-LCD devices drive the liquid crystal layer by varying multitude of electrical fields between the common and pixel electrodes and have excellent transmittance of light and aperture ratio.

However, a driving mode mentioned above has a disadvantage in bed sight angle. To resolve this disadvantage, a new driving mode, such as an in-plane switching mode, has been suggested. An LCD device illustrated below use the in-plane switching mode (IPS), so that they have excellent sight angle.

FIG. 1 is a cross-sectional view of an IPS-LCD device according to the related art. As shown in FIG. 1, the IPS-LCD device B includes a liquid crystal layer LC, upper and lower substrates B1 and B2. The upper and lower substrates B1 and B2 face each other, and the liquid crystal layer LC is interposed between the upper and lower substrates B1 and B2.

The lower substrate B2 includes a substrate 50, thin film transistor T, common electrode 58 and pixel electrode 72. The substrate 50 has pixel regions P1 and P2. The thin film transistor T, the common electrode 58 and the pixel electrode 72 are formed on each pixel region P1 and P2. The thin film transistor T includes a gate electrode 52, a semiconductor layer 62, a source electrode 64 and a drain electrode 66. The gate electrode 52 is formed on the substrate 50, and the semiconductor layer 62 is formed over the gate electrode 52 with a gate insulating layer 60 interposed therebetween. The source and drain electrodes 64 and 66, which are separated from each other, are formed on the semiconductor layer 62.

Generally, the common electrode 58 is made of the same material and on the same layer as the gate electrode 52. The pixel electrode 72 is made of the same material and on the same layer as the source and drain electrodes 64 and 66. However, as shown in FIG. 1, the pixel electrode 72 is made of a transparent material to improve the aperture ratio. A gate line, not shown, is formed along a side of the pixel regions P1 and P2, and a data line, not shown, is formed perpendicular with the gate line. The gate and data lines define the pixel regions P1 and P2. A common line, not shown, which applies a voltage to the common electrode 57, is also formed on the substrate 50.

The upper substrate B1 includes a substrate 30, a black matrix 32, and color filters 34a and 34b. The black matrix 32 is formed at portions corresponding to the thin film transistor T, the gate and data lines. The color filters 34a and 34b are formed at portions corresponding to the pixel regions P1 and P2. The IPS-LCD device is driven by horizontal electrical field 95 between the common and pixel electrodes 58 and 72.

FIG. 2 is a plane view of a lower substrate for an IPS-LCD device according to the related art. As shown in FIG. 2, the lower substrate includes a substrate 50, a gate line 51, a data line 61, a common line 70 and a thin film transistor T. The gate line 51 and the data line 61 cross each other to define a pixel region P. The common line 70 is separated from the gate line 51 and also parallel to the gate line 51. A thin film transistor T is formed at a crossing portion of the gate 51 and data lines 61, and includes a gate electrode 52, a semiconductor layer 62, source and drain electrodes 64 and 66. The gate electrode 52 is connected to the gate line 51. The semiconductor layer 62 is formed on the gate electrode 52. And the source and drain electrodes 64 and 66 are formed on the semiconductor layer 62.

A common electrode 58 and a pixel electrode 72 are formed on the pixel region P. The common electrode 58 is connected to the common line 70 and extends perpendicularly from the common line 70 to the pixel region P. The pixel electrode 72 is connected to the drain electrode 66 and is alternatively arranged with the common electrode 58. In the lower substrate having the above mentioned structure, there is a step difference between the common and pixel electrodes 58 and 72, since the common and pixel electrodes 58 and 72 are formed on different layers. Therefore, the electric field has non-uniform distribution.

FIG. 3 is a cross-sectional view taken along a line III-III of FIG. 2. As shown in FIG. 3, a substrate 50 has a pixel region P. First, a common electrode 58 is formed on the substrate 50 in the pixel region. The common electrode 58 is made of the same material as a gate line at the same time. A gate insulating layer GI is formed on the common electrode 58, and a data line, not shown, is formed on the gate insulating layer GI. In addition, a pixel electrode 72 is formed on the gate insulating layer GI in the pixel region P.

Because the common electrode 58 and the pixel electrode 72 are formed on the upper and lower surface of the gate insulating layer GI, and since the gate insulating layer GI is made of inorganic material, the gate insulating layer GI has a step difference. It is very difficult to obtain a relatively low step difference when the inorganic material layer is made by a deposition process.

Therefore, as shown in FIG. 3, the distribution of the electric field 95 between the common electrode 58 and the pixel electrode 72 becomes inclined to the left or right. The inclined distribution could result from misalignment caused in the process of forming the common electrode 58 and pixel electrode 72 on different layers. The inclined distribution becomes more severe when the pixel electrode 72 is made of a transparent material.

FIG. 4 is a cross-sectional view of array substrate for IPS-LCD device according to the related art. As shown FIG. 4, a common electrode 58 is formed on a substrate 50. The common electrode 58 is made of the same material and the same layer as a gate line. Then, a gate insulating layer GI is formed on the substrate 50 having the common electrode 58, and a data line, not shown, is formed on the gate insulating layer. A passivation layer PL is formed on the substrate 50 having the data, and a transparent pixel electrode 72 is formed on the passivation layer PL.

Since the gate insulating layer GI and passivation layer PL are interposed between the common electrode 58 and pixel electrode 72, the gate insulating layer GI and the passivation layer PL have step differences as high as a thickness of the common electrode. As mentioned above, the step differences are generated because the gate insulating layer GI and the passivation layer PL are made of inorganic material. The step differences affect the distribution of electric field such that the distribution of electric field between the common electrode 58 and pixel electrode 72 becomes inclined to the left or right. Accordingly, the LCD device using the substrate according to the related art has problems represented by residual images and non-uniform image quality.

SUMMARY OF THE INVENTION

Accordingly, the present invention is directed to an array substrate for an IPS-LCD device and a method of fabricating the same that substantially obviate one or more of the problems due to limitations and disadvantages of the related art.

An object of the present invention is to provide an array substrate for an IPS-LCD device having an improved display quality without residual images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for an IPS-LCD device includes a substrate; a gate line on the array substrate; a data line on the substrate, crossing the gate line to define a pixel region; a common electrode in the pixel region on the substrate; a thin film transistor formed at a crossing of the gate line and data line; an insulating layer on the common electrode, the insulating layer having a concave portion spaced apart from the common electrode; and a pixel electrode in the concave portion.

In another aspect of the present invention, a LCD device includes a color filter substrate; an array substrate facing the color filter substrate, the array substrate including a substrate; a gate line on the substrate; a data line on the substrate crossing the gate line to define a pixel region; a common electrode in the pixel region on the substrate; a thin film transistor formed at a crossing of the gate line and data line; an insulating layer on the common electrode, the insulating layer having a concave portion spaced apart from the common electrode; and a pixel electrode in the concave portion; and a liquid crystal layer interposed between the color filter substrate and the array substrate.

In another aspect of the present invention, a method of fabricating an array substrate for an IPS-LCD device includes forming a gate line on an array substrate; forming a data line on the substrate, crossing the gate line to define a pixel electrode; forming a common electrode in the pixel electrode on the substrate; forming a thin film transistor at a crossing of the gate line and the data line; forming an insulating layer on the common electrode, the insulating layer having a concave portion spaced apart from the common electrode; and forming a pixel electrode in the concave portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a portion of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
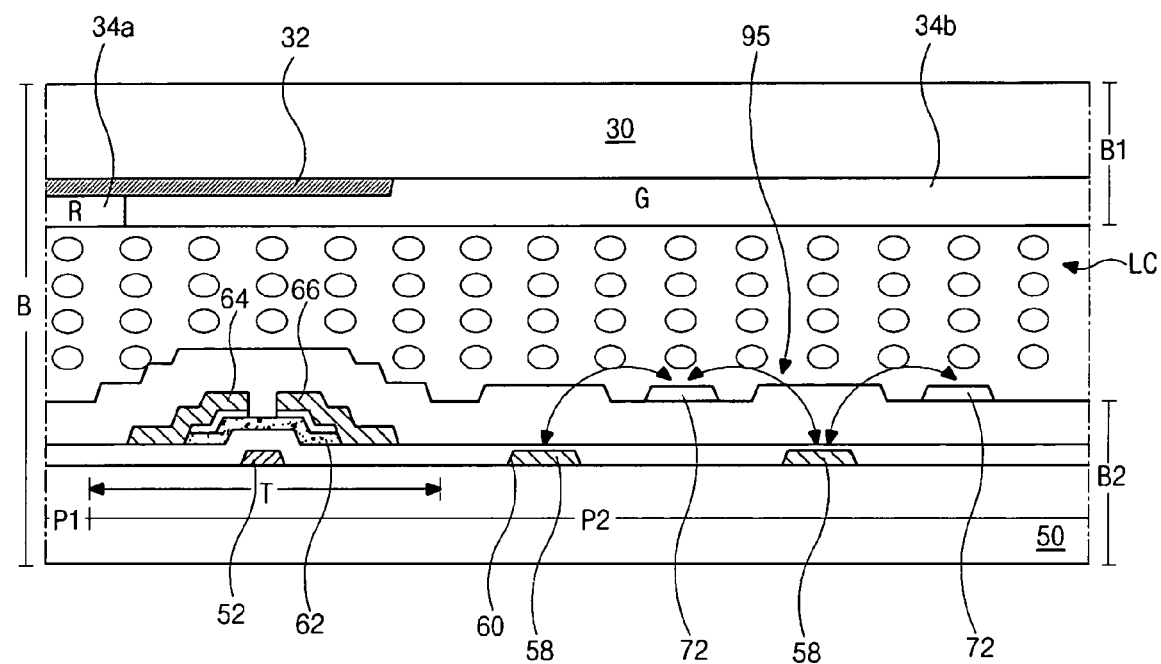
FIG. 1 is a schematic cross-sectional view of an IPS-LCD device according to the related art.
Figure 2:
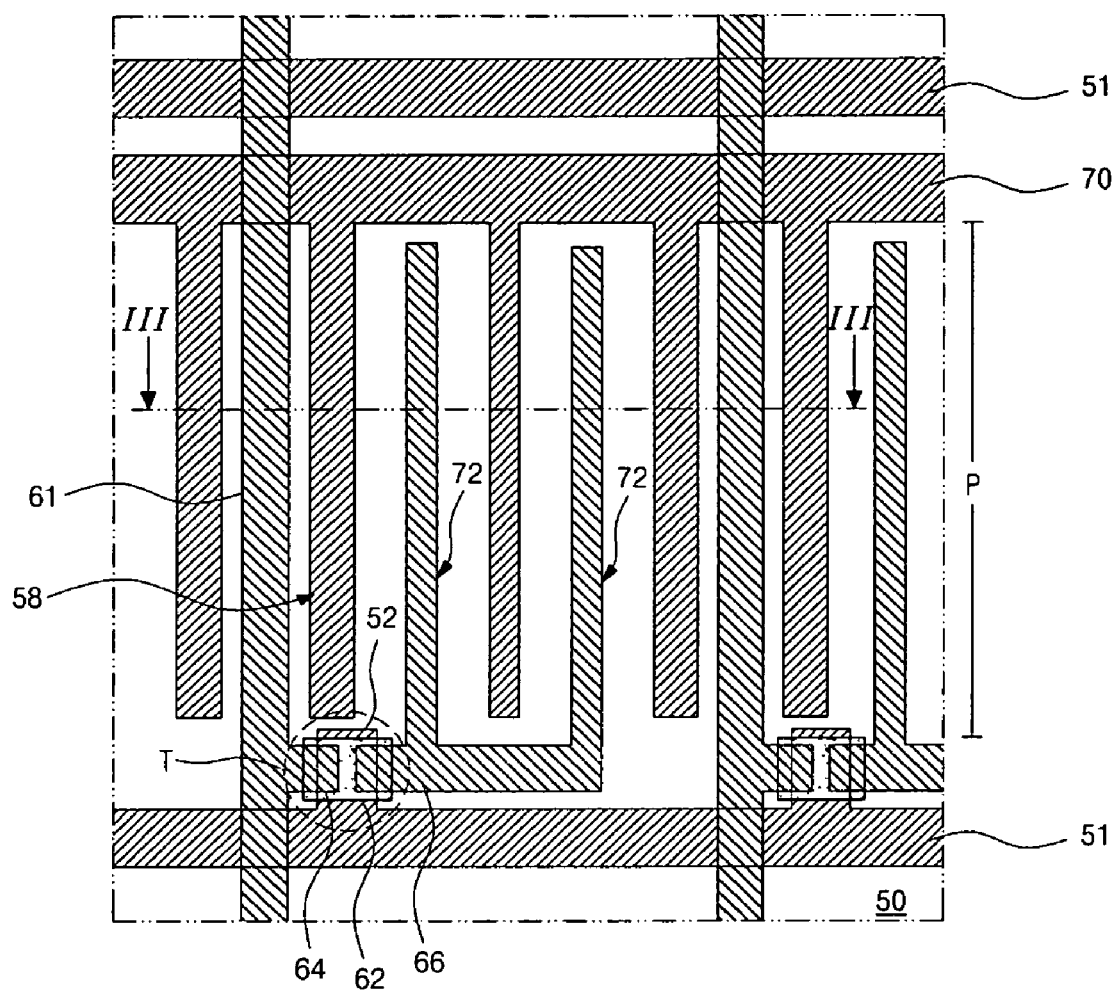
FIG. 2 is a plane view of a pixel region of an array substrate for an IPS-LCD device according to the related art.
Figure 3:
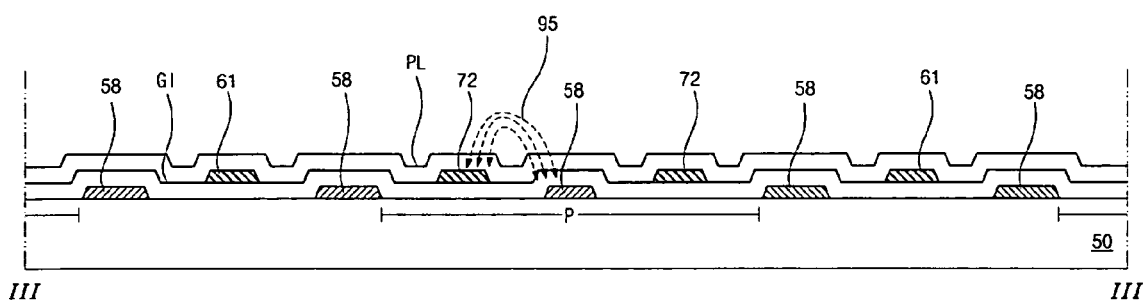
FIG. 3 is a cross-sectional view of an array substrate for an IPS-LCD device according to the related art.
Figure 4:
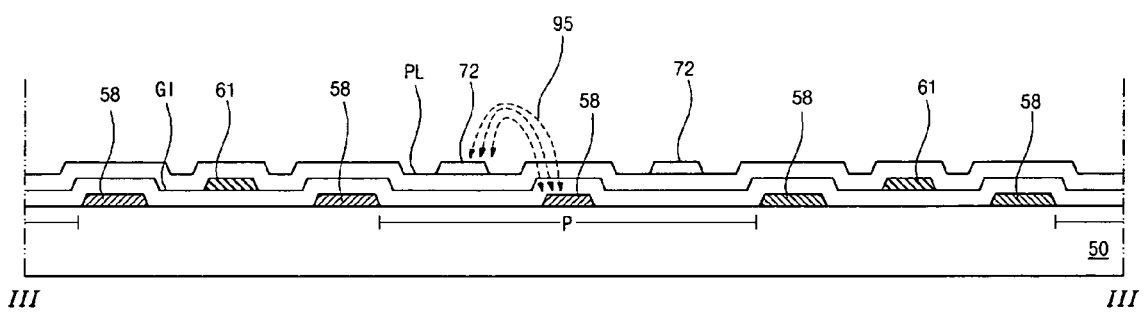
FIG. 4 is a cross-sectional view of an array substrate for an IPS-LCD device according to the related art.
Figure 5:
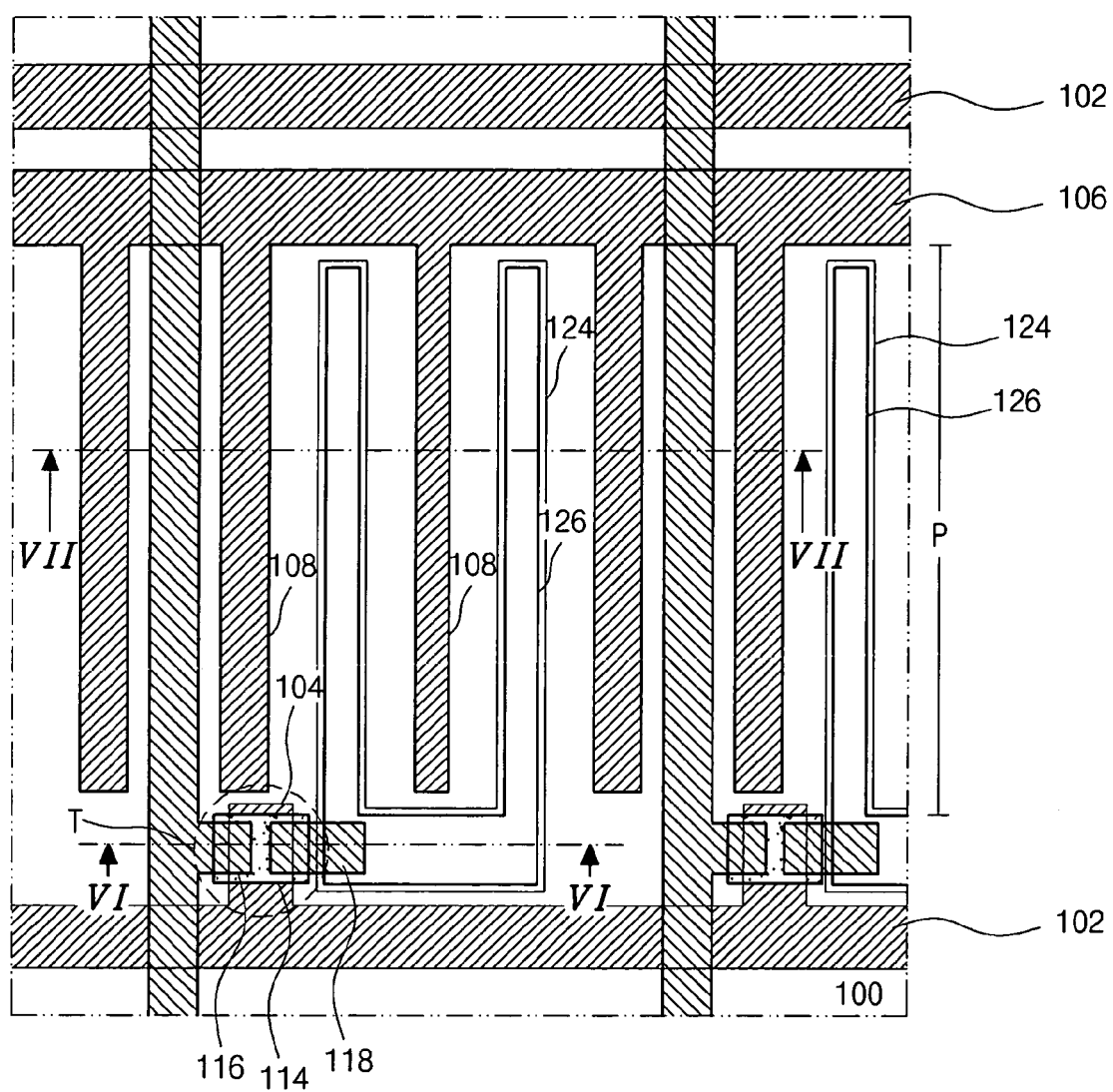
FIG. 5 a plane view of a pixel region of an array substrate for an IPS-LCD device according to an exemplary embodiment of the present invention.

FIG. 5 is a plane view of a pixel region of an array substrate for an IPS-LCD device according to an exemplary embodiment of the present invention. As shown in FIG. 5, a gate line 102, a data line 120, a common line 106 and a thin film transistor T are formed on a substrate 100. The gate line 120 and the data line 120 cross each other to define a pixel region P. The common line 106 is formed on the substrate 100 and is separated from the gate line 102. The thin film transistor T, which has a gate electrode 104, an active layer 114, a source electrode 116 and a drain electrode 118, is formed at the crossing of the gate line 102 and date line 120.

A pixel electrode 126 and a common electrode 108 are formed in the pixel region P. The common electrode 108 perpendicularly extends to the common line, and the pixel electrode 126, which is separated from the common electrode 108, is connected to the drain electrode 118 and extends therefrom.

When the pixel electrode 126 is formed over the common electrode 108, a concave portion is formed by etching a gate insulating layer and/or passivation layer. Then, the pixel electrode 126 is formed in the concave portion. Because the common electrode 108 and the pixel electrode 126 are disposed at substantially the same height, the electric field between the common electrode 108 and pixel electrode 126 has symmetric distribution. Accordingly, a response rate of liquid crystal molecules increases, and an LCD device using a substrate according to the present invention can display high quality images without residual images.

FIG. 6A to 6D and FIG. 7A to 7D are schematic cross-sectional views showing a fabrication process of a portion taken along the VI-VI and the VII-VII lines of FIG. 5 and the VII-VII respectively.

Figure 6A:
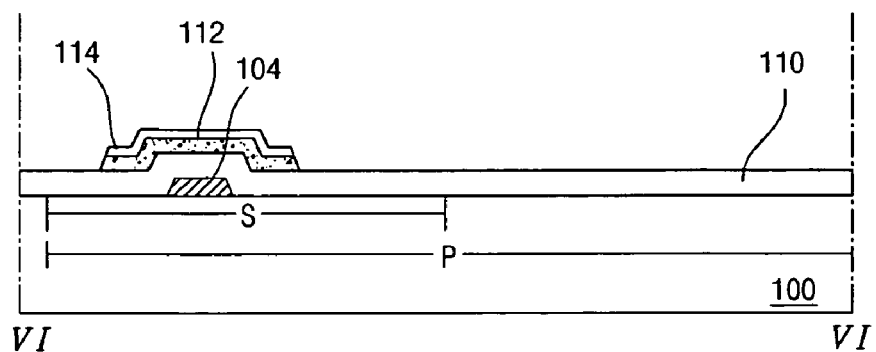
FIGS. 6A to 6D are schematic cross-sectional views showing a fabrication process of a portion taken along the line VI-VI of FIG. 5.
Figure 7A:
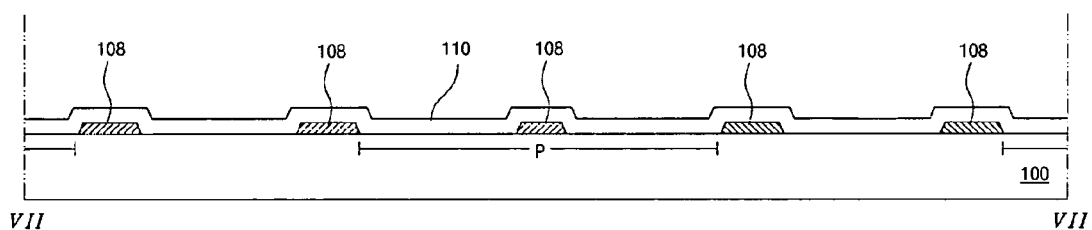
FIGS. 7A to 7D are schematic cross-sectional views showing a fabrication process of a portion taken along the line VII-VII of FIG. 5.

As shown in FIG. 6A and FIG. 7A, a pixel region P including a switching region S is formed on a substrate 100. A gate line 102 (of the FIG. 5), a common line 106 (of the FIG. 5), a common electrode 108 (of the FIG. 5) and a gate electrode 104 are formed by depositing and patterning a metal layer. The gate line is formed on an edge portion of the pixel region P, and the common line is parallel to and separated from the gate line. The common electrode extends from the common line to the pixel region P, and the gate electrode 104 extends from the gate line. The metal layer is formed by depositing and patterning at least one of aluminum, aluminum alloy, tungsten, molybdenum, titanium, chrome, moly-tungsten and copper. A gate insulating layer 110 is formed on the common electrode 108. The gate insulating layer 110 is formed by depositing at least one of silicon nitride and silicon oxide.

Next, an active layer 112 and ohmic contact layer 114 are formed over the gate electrode 104 by depositing and patterning pure amorphous silicon (a-Si:H) and impure amorphous silicon (n+ or p+ a-Si:H) on the gate insulating layer 110.

Figure 6B:
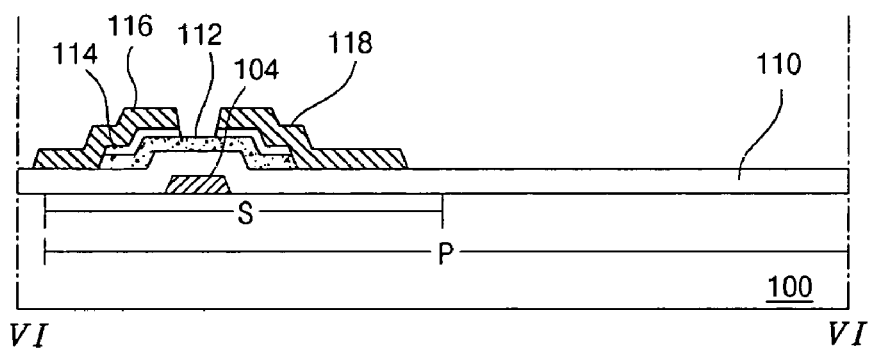
Figure 7B:
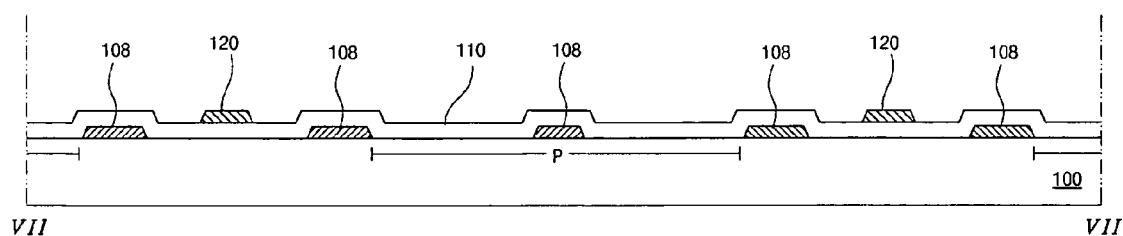

As shown in FIG. 6B and FIG. 7B, a source electrode 116, a drain electrode 118 and a data line 120 are formed on the ohmic contact layer 114 by depositing and patterning at least one of aluminum, aluminum alloy, tungsten, molybdenum, titanium, chrome, moly-tungsten and copper. The source and drain electrodes 116 and 118 connect to the ohmic contact layer and are separated from each other. The data line 120 is connected to the source electrode 116, and is formed on an edge portion of the pixel region P to cross the gate line 102.

Figure 6C:
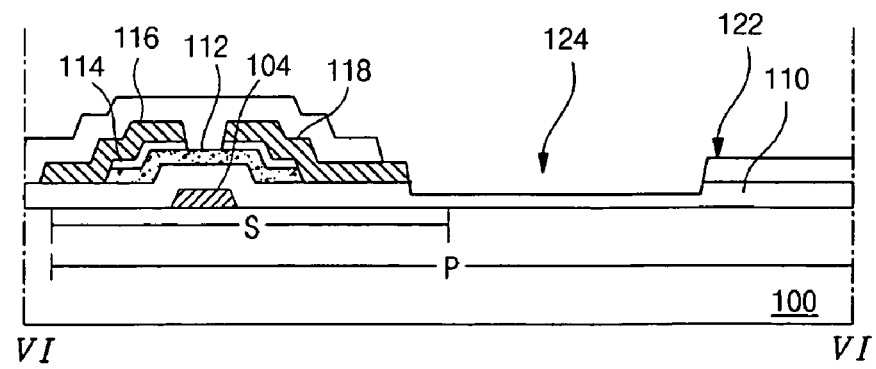
Figure 7C:
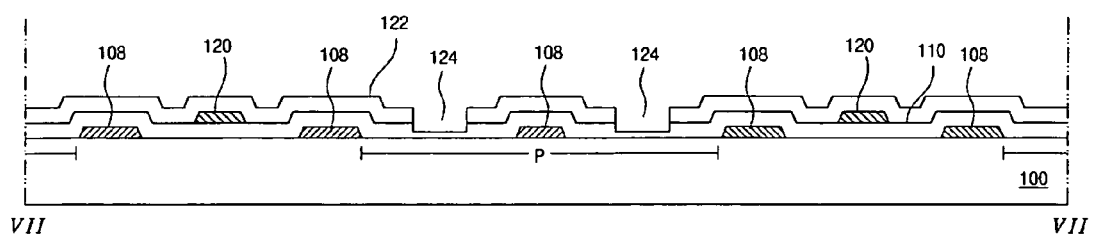

As shown in FIG. 6C and FIG. 7C, a passivation layer 122 is formed on the source and drain electrodes 116 and 118 by depositing at least one of silicon nitride and silicon oxide.

A concave portion 124 is formed through the passivation layer 112 and gate insulating layer 110 by sequentially etching the passivation layer 112 and gate insulating layer 110. The concave portion 124 can expose the drain electrode 118. The concave portion 124 has a bar shape and is extended to the pixel region P. The concave portion 124 is disposed through the substrate 100 or a portion of the gate insulating layer. That is, the concave portion 124 is formed through the passivation layer 112 and the gate insulating layer 110 or exposes the substrate 100.

Figure 6D:
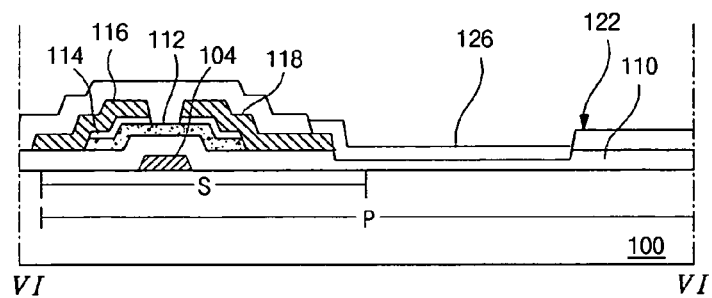
Figure 7D:
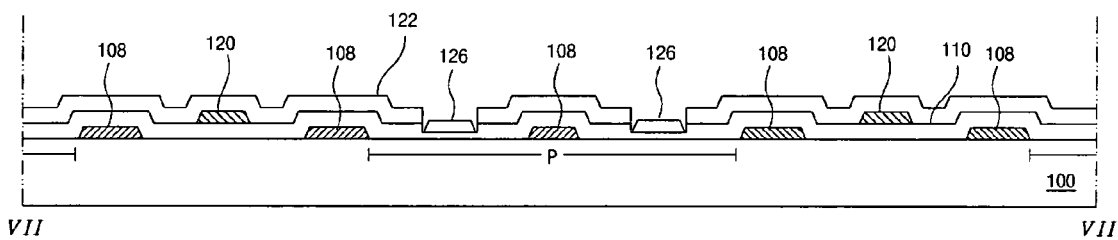

As shown in FIG. 6D and FIG. 7D, a pixel electrode 126 is formed in the concave portion 124 by depositing and patterning one of indium-tin-oxide (ITO) and indium-zinc-oxide (IZO). The pixel electrode 126 is connected to the drain electrode 118 extending parallel to the gate line 102 of the FIG. 5, and perpendicularly extends to the pixel region P.

Through the process mentioned above, the pixel electrode 126 and the common electrode 108 are located on the same height. Thus, a step difference between the pixel 126 and the common electrode 108 is not generated. Accordingly, the problem of inclination of the electric field between the pixel electrode 126 and the common electrode 108 does not occur, and therefore, the intensity of the electric field increases. An LCD device using a substrate according to the present invention displays high quality images without residual images.

In summary, an array substrate for an IPS-LCD device according to the present invention prevents distortion of the electric field distribution resulting from the step difference between the common electrode and the pixel electrode, by forming a pixel electrode in the concave portion of the insulating layer including the gate insulating layer and the passivation layer.

It will be apparent to those skilled in the art that various modifications and variations can be made in the array substrate for the liquid crystal display device and the method of fabricating the same of the present invention without departing from the sprit or scope of the invention. Thus, it is intended that the present invention covers the modifications and variations of this invention provided they come within the scope of the appended claims and their equivalents.

What is claimed is:

1. An array substrate for an in-plane switching mode liquid crystal display device, comprising:
    a substrate;
    a gate line on the substrate;
    a common electrode in a pixel region on the substrate;
    a gate insulating layer on the gate line and the common electrode;
    a data line on the gate insulating layer crossing the gate line to define the pixel region;
    a thin film transistor formed at a crossing of the gate line and data line;
    a passivation layer on the thin film transistor and the data line;
    a concave portion through the gate insulating layer and the passivation layer; and
    a pixel electrode in the concave portion,
    wherein a bottom surface of the pixel electrode in the concave portion is substantially parallel to a top surface of the substrate and contacts the gate insulating layer.

2. The array substrate according to claim 1, wherein the pixel electrode includes one of indium-tin-oxide and indium-zinc-oxide.

3. The array substrate according to claim 1, wherein at least one of the gate insulating layer and the passivation layer includes at least one of silicon nitride and silicon oxide.

4. The array substrate according to claim 1, wherein the pixel electrode and the concave portion have first and second widths, respectively, along the gate line, and wherein the first width is substantially same as the second width.

5. The array substrate according to claim 1, wherein the pixel electrode has substantially the same height as the common electrode.

6. The array substrate according to claim 1, wherein the thin film transistor includes a gate electrode connected to the gate line, an active layer and an ohmic contact layer on the gate electrode, a source electrode connected to the data line, and a drain electrode connected to the pixel electrode.

7. The array substrate according to claim 6, wherein the passivation layer includes a drain contact hole exposing a portion of the drain electrode.

8. A liquid crystal display device, comprising:
    a color filter substrate;
    an array substrate facing the color filter substrate, the array substrate including:
        a substrate,
        a gate line on the substrate,
        a common electrode in a pixel region on the array substrate, a gate insulating layer on the gate line and the common electrode, a data line on the gate insulating layer crossing the gate line to define the pixel region, a thin film transistor formed at a crossing of the gate line and data line, a passivation layer on the thin film transistor and the data line, a concave portion through the gate insulating layer and the passivation layer, and a pixel electrode in the concave portion; and a liquid crystal layer interposed between the color filter substrate and the array substrate, wherein a bottom surface of the pixel electrode in the concave portion is substantially parallel to a top surface of the substrate and contacts the gate insulating layer.

9. The liquid crystal device according to claim 8, wherein the pixel electrode includes one of indium-tin-oxide and indium-zinc-oxide.

10. The liquid crystal device according to claim 8, wherein at least one of the gate insulating layer and the passivation layer includes at least one of silicon nitride and silicon oxide.

11. The liquid crystal device according to claim 8, wherein the pixel electrode and the concave portion have first and second widths, respectively, along the gate line, and wherein the first width is substantially same as the second width.

12. The liquid crystal device according to claim 8, wherein the pixel electrode has substantially the same height as the common electrode.

13. The liquid crystal device according to claim 8, wherein the thin film transistor includes a gate electrode connected to the gate line, an active layer and an ohmic contact layer on the gate electrode, a source electrode connected to the data line, and a drain electrode connected to the pixel electrode.

14. The array substrate according to claim 13, wherein the passivation layer includes a drain contact hole exposing a portion of the drain electrode.

15. A method of fabrication an array substrate for an in-plane switching mode liquid crystal display device, comprising:

forming a gate line on a substrate;

forming a common electrode in a pixel region on the substrate;

forming a gate insulating layer on the gate line and the common electrode;

forming a data line on the gate insulating layer crossing the gate line to define the pixel electrode;

forming a thin film transistor at a crossing of at a crossing of the gate line and the data line;

forming a passivation layer on the thin film transistor and the data line;

forming a concave portion through the passivation layer and the gate insulating layer; and forming a pixel electrode in the concave portion, wherein a bottom surface of the pixel electrode in the concave portion is substantially parallel to a top surface of the substrate and contacts the gate insulating layer.

16. The method according to claim 15, wherein the pixel electrode includes one of indium-tin-oxide and indium-zinc-oxide.

17. The method according to claim 15, wherein at least one of the gate insulating layer and the passivation layer includes at least one of silicon nitride and silicon oxide.

18. The method according to claim 15, wherein the pixel electrode and the concave portion have first and second widths, respectively, along the gate line, and wherein the first width is substantially same as the second width.

19. The method according to claim 15, wherein the pixel electrode has substantially the same height as the common electrode.

20. The method according to claim 15, wherein the forming the thin film transistor includes a forming a gate electrode connected to the gate line, a forming an active layer and an ohmic contact layer on the gate electrode, a forming a source electrode connected to the data line, and a forming a drain electrode connected to the pixel electrode.

21. The method according to claim 20, wherein the forming the concave portion exposes a portion of the drain electrode.

* * * * *